June 10, 1952 — R. D. HUTTON — 2,599,637
AUTOMOBILE BATTERY CIRCUIT BREAKER
Filed Nov. 17, 1950
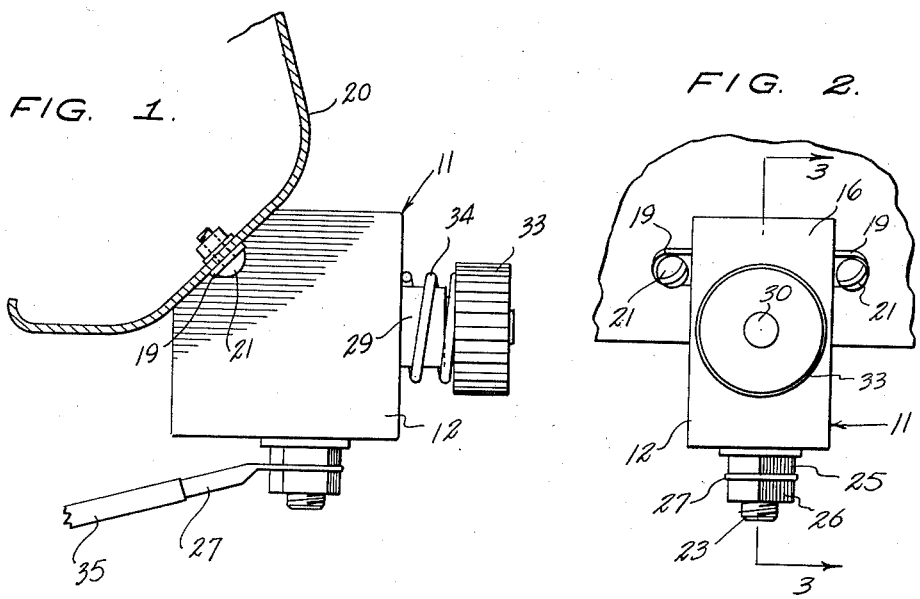
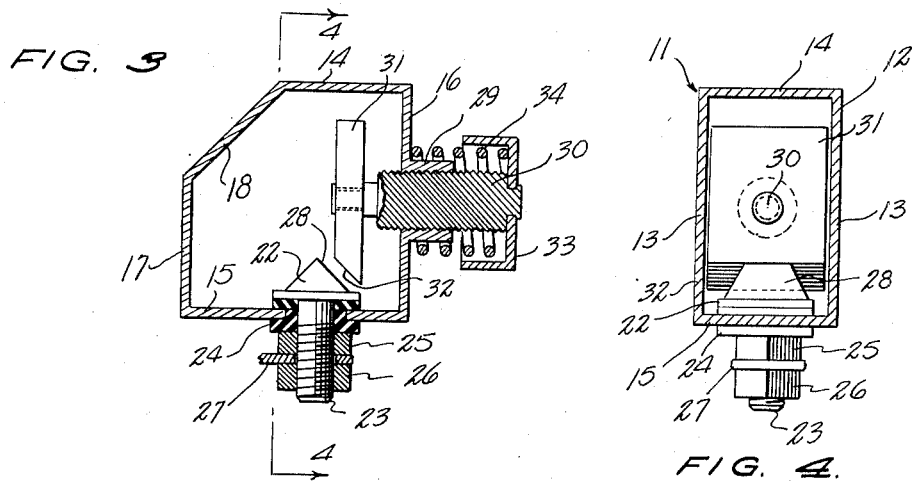
INVENTOR.
ROBERT D. HUTTON,
BY
McMorrow, Berman & Davidson
ATTORNEYS Patented June 10, 1952

2,599,637

UNITED STATES PATENT OFFICE 2,599,637

AUTOMOBILE BATTERY CIRCUIT BREAKER

Robert D. Hutton, Garvey, Calif.

Application November 17, 1950, Serial No. 196,264

2 Claims. (Cl. 200—158)

This invention relates to circuit makers and breakers, and more particularly to an improved switch device for use on motor vehicles for interposition between the ground side of the automobile battery and ground, so that the current flow from the battery can be entirely shut off from a single position in the automobile.

A main object of the invention is to provide a novel and improved battery-circuit controlling switch for a motor vehicle which is simple in construction, which is easy to install, and which is very reliable in operation.

A further object of the invention is to provide an improved battery-circuit controlling switch for a motor vehicle, said switch being inexpensive to manufacture, involving only a few parts, being rugged in construction, and allowing the operator of the motor vehicle on which it is employed to rapidly open the battery circuit on the ground side thereof whenever desired.

Further objects and advantages of the invention will become apparent from the following description and claims, and from the accompanying drawings, wherein:

Figure 1 is a fragmentary longitudinal cross-sectional view through the dashboard portion of a motor vehicle showing an improved circuit-making and breaking switch device according to the present invention mounted thereon, said switch device being shown in side elevation;

Figure 2 is a fragmentary front elevational view of the dashboard portion shown in Figure 1, showing the improved switch device in front elevation;

Figure 3 is a cross-sectional view taken on line 3—3 of Figure 2;

Figure 4 is a cross-sectional view taken on line 4—4 of Figure 3.

Referring to the drawings, the switch device is designated generally at 11 and comprises a housing 12 which is generally rectangular in shape and which has the side walls 13, 13, the top wall 14, the bottom wall 15, the front wall 16 and the rear wall 17 which has an upper sloping portion 18 provided with the laterally extending apertured lugs 19, 19 at the ends thereof.

As shown in Figures 1 and 2, the housing 12 may be secured to a conventional automobile dashboard 20 by means of bolts 21 engaged through the lugs 19 and extending through the dashboard 20.

Designated at 22 is a contact which is provided with a depending shank portion 23 which extends through an insulating bushing 24 mounted in the bottom wall 15 of the housing 12. The shank 23 is provided with respective nuts 25 and 26, and designated at 27 is a terminal lug which is secured on the shank 23 between the bolts 25 and 26, said bolts also serving to lock the shank 23 with respect to the bushing 24 and to rigidly secure the contact 22 to the bottom wall 15 of the housing 12 through said bushing. The top portion of the contact tapers upwardly, as shown in Figures 3 and 4, and said contact presents a forwardly facing, inclined, contact surface 28 which slopes downwardly and rearwardly, as viewed in Figure 3.

The front wall 16 of the housing 12 is formed with the internally threaded collar 29 in which is threadedly engaged a shaft member 30. Rotatably secured to the front end of the shaft member 30 is a substantially rectangular contact member 31 which is slidably and non-rotatively received between the side walls 13, 13 of the housing 12. The lower edge of the contact member 31 is formed with the sloping contact surface 32 which is parallel to the surface 28 of contact 22 and which is movable into engagement therewith responsive to rotation of the shaft member 30. Secured to the outer end of the shaft member 30 is a cup-shaped knob 33, and designated at 34 is a coil spring which surrounds the shaft member 30 and the collar 29 and which bears between the cup-shaped knob 33 and the wall 16 of housing 12.

Normally, the shaft member 30 is rotated so that the contact member 31 is in electrical contact with the contact member 22. As shown in Figure 1, the terminal 27 has connected thereto a conductor 35 which is connected to the ground side of the vehicle battery. Since the housing 12 is grounded to the vehicle, the ground side of the battery is connected to the vehicle ground through the contacts 22 and 31. The spring 34 is compressed and prevents any looseness from developing between the shank 30 and the collar 29. When it is desired to open the vehicle battery circuit, the operator merely rotates the knob 33 to withdraw shank 30 relative to contact 22 and the retractile movement of the shank 30 is aided by the expansion of the spring 34. This enables the operator to rapidly disengage the contact 31 from the contact 22 and to open the vehicle battery circuits, thereby avoiding any fire hazards due to short circuits and the like in the event of collisions or other accidents involving possible short circuiting of the vehicle battery circuit.

The switch device 11 is mounted on the vehicle dashboard in a position within easy reach of the operator of the vehicle, whereby the operator may quickly open the vehicle battery circuit in any emergency which may arise merely by turning the knob 33 to disengage contact 31 from contact 22 in the manner above described.

While a specific embodiment of an improved circuit-making and breaking switch device for the battery circuit of a motor vehicle has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A safety switch of the character described comprising a housing having parallel side walls, a bottom wall normal to said side walls and a front wall normal to both said bottom wall and said side walls, a terminal stud extending through said bottom wall, a head on said stud having an inclined contact surface normal to said side walls and facing said front wall, a threaded shaft threadedly engaged in said front wall and extending normal to said front wall and parallel to said side walls, and a parallel sided contact block rotatably secured on the inner end of said stud between said head and said front wall and slidably engaging the side walls at its sides, the bottom end of said block being beveled and arranged parallel to said inclined contact surface and being arranged to engage said contact surface with face to face contact responsive to inward movement of said threaded shaft into said housing.

2. A safety switch of the character described comprising a housing having parallel side walls, a bottom wall normal to said side walls and a front wall normal to both said bottom wall and said side walls, a terminal stud extending through said bottom wall, a head on said stud having an inclined contact surface normal to said side walls and facing said front wall, a threaded shaft threadedly engaged in said front wall and extending normal to said front wall and parallel to said side walls, a parallel sided contact block rotatably secured on the inner end of said stud between said head and said front wall and slidably engaging the side walls at its sides, the bottom end of said block being beveled and arranged parallel to said inclined contact surface and being arranged to engage said contact surface with face to face contact responsive to inward movement of said threaded shaft into the housing, a knob member rigidly secured to the outer end of said shaft, and a coiled spring surrounding the outer portion of said shaft and bearing between said knob member and said front wall.

ROBERT D. HUTTON.

REFERENCES CITED

The following references are of record in the file of this patent:

UNITED STATES PATENTS

| Number | Name | Date |
|---|---|---|
| 1,920,713 | Prince | Aug. 1, 1933 |
| 2,061,460 | Freysinger et al. | Nov. 17, 1936 |